(12) United States Patent
Neelannavar et al.

(10) Patent No.: US 12,271,301 B1
(45) Date of Patent: Apr. 8, 2025

(54) PROVIDING HOST WITH MULTIPLE MAPPING INFORMATION THAT SPAN ACROSS MULTIPLE HPB REGIONS

(71) Applicant: WESTERN DIGITAL TECHNOLOGIES, INC., San Jose, CA (US)

(72) Inventors: Savita Neelannavar, Bangalore (IN); Laxmi Bhoopali, Bangalore (IN)

(73) Assignee: SANDISK TECHNOLOGIES, INC, Milpitas, CA (US)

( * ) Notice: Subject to any disclaimer, the term of this patent is extended or adjusted under 35 U.S.C. 154(b) by 0 days.

(21) Appl. No.: 18/372,805

(22) Filed: Sep. 26, 2023

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ...................... G06F 12/0246; G06F 2212/7201
See application file for complete search history.

(56) References Cited

U.S. PATENT DOCUMENTS

| | | | |
|---|---|---|---|
| 10,223,010 B2 | 3/2019 | Kowles | |
| 11,169,744 B2 | 11/2021 | Brief | |
| 2019/0251024 A1 | 8/2019 | Jung | |
| 2020/0364157 A1* | 11/2020 | Byun | .................. G06F 12/0868 |
| 2022/0004341 A1 | 1/2022 | Chen | |
| 2022/0012174 A1 | 1/2022 | Seok | |
| 2022/0058134 A1 | 2/2022 | Minopoli | |
| 2022/0253388 A1 | 8/2022 | Zhang | |
| 2023/0418513 A1* | 12/2023 | You | .......................... G06F 3/061 |
| 2024/0256457 A1* | 8/2024 | Kim | ..................... G06F 12/0862 |

FOREIGN PATENT DOCUMENTS

| | | |
|---|---|---|
| WO | 2021173864 A1 | 9/2021 |
| WO | 2022047619 A1 | 3/2022 |

OTHER PUBLICATIONS

Kim Yoona, Inhyuk Choi, Juhyung Park, Jaeheon Lee, Sungjin Lee, Jihong Kim; Integrated Host-SSD Mapping Table Management for Improving User Experience of Smartphones; 2023, 21st USENIX Conference on File and Storage Technologies, FAST 23, pp. 441-456.

* cited by examiner

*Primary Examiner* — Chie Yew
(74) *Attorney, Agent, or Firm* — Neal Blibo LLC; Arlene Neal (57) ABSTRACT

A storage device minimizes HPB entry inactivation resulting from data associated with hot reads being retrieved from multiple HPB sub-regions covering a logical-to-physical table. The storage device may support the HPB feature and a multiple HPB sub-region mode. The storage device includes a controller that tracks a hit count associated with a logical block address in a read command. The controller determines that the hit count has reached a hit threshold and updates a hit table to identify logical block address pages associated with hit counts that have reached the hit threshold across HPB sub-regions covering a logical-to-physical table. The controller transmits the hit table to a host device to be stored in an HPB cache on the host device and to be used by the host device for read commands sent from the host device to the storage device.

20 Claims, 9 Drawing Sheets

PROVIDING HOST WITH MULTIPLE MAPPING INFORMATION THAT SPAN ACROSS MULTIPLE HPB REGIONS

BACKGROUND

A host may transmit a command to read data from and/or write data to, for example, a flash memory device coupled to a storage device. The storage device may store data in blocks on the memory device wherein the host may address the data using logical block addresses that may be mapped to physical addresses on the memory device. The logical block address to physical address mappings may be stored in a logical-to-physical (L2P) table cached in the storage device, wherein the storage device may access the L2P table to retrieve data from the memory device.

In some specifications, to compensate for limited dynamic random-access memory (DRAM) on the storage device, a host memory buffer (HMB) feature may be used by the storage device. The storage device may use the HMB (i.e., a buffer on the host) to store entries in the L2P table. The host may share pointers for the HMB with the storage device and the storage device may use the pointers to access the HMB directly.

In some specifications, a host performance booster (HPB) feature may be used wherein an HPB cache (i.e., a buffer on the host) may be used to store portions of the entries in the L2P table. The L2P table may be divided into HPB regions and an HPB region may be divided into HPB sub-regions (i.e., regions including sequential L2P entries associated with logical block addresses) which may be stored in the HPB cache. In specifications using the HPB feature, the host may not share buffer pointers for the HPB cache with the storage device but may issue a read request to retrieve the logical and physical addresses for data and populate the HPB cache.

When the storage device is initialized, the host may determine if the storage device supports the HPB feature, and if it does, the host may activate a device-controlled mode or host-controlled mode on the storage device and allocate space in the host memory for the HPB cache. In the device-controlled mode, the storage device may select the HPB sub-regions to be cached in the HPB cache, and in the host-controlled mode, the host may indicate to the storage device which HPB sub-region to select. The L2P table entries for the selected HPB sub-region may be cached by the storage device and transmitted to the host in response to an HPB read buffer command received from the host. The host may store the portions of the L2P table associated with the selected HPB sub-region in the HPB cache in the host memory. When the host wants to retrieve data associated with entries in the HPB sub-region, the host may issue an HPB read command to read the data from the memory device. The host may obtain the physical address associated with a given logical address from the HPB cache and include the logical and physical addresses for the data in the HPB read command sent to the storage device. The storage device may fetch the data from the memory device using the physical address in the HPB read command sent from the host.

The host may issue a HPB read buffer command at any given time to retrieve L2P entries for a maximum of two sub-regions and the host may store the retrieved entries in the HPB cache. As such, the host may send multiple HPB read buffer commands to retrieve the L2P mappings for the maximum number of active HPB sub-regions to be stored in the HPB cache. In some cases, data which is frequently accessed (referred to herein as hot data) may be in multiple HPB sub-regions. For example, if there are ten total HPB sub-regions and the maximum number of current active HPB sub-regions that may be stored in the HPB cache is two, the host may frequently access data associated with L2P entries in four sub-regions, such that the host may frequently access two L2P entries in a first sub-region, one L2P entry in a second sub-region, two L2P entries in a third sub-region, and two L2P entries in a fourth sub-region. If the first and third sub-regions are stored in the HPB cache (i.e., these are active sub-regions), the host may have to inactivate one of the active sub-regions to cache data associated with the second or fourth sub-regions. As such, when the hot data is spread across HPB sub-regions, the host may have to frequently activate and inactivate the sub-regions stored in the HPB cache.

SUMMARY

In some implementations, the storage device minimizes HPB entry inactivation resulting from data associated with hot reads being retrieved from multiple HPB sub-regions covering a logical-to-physical table. The storage device may support the HPB feature and a multiple HPB sub-region mode. The storage device is communicatively coupled to a host device including an HPB cache. The storage device also includes a controller to track a hit count associated with a logical block address, determine that the hit count has reached a hit threshold, and update a hit table to identify logical block address pages associated with hit counts that have reached the hit threshold across HPB sub-regions covering the logical-to-physical table. The controller transmits the hit table to a host device to be stored in an HPB cache on the host device and to be used by the host device for read commands sent from the host device to the storage device.

In some implementations, a method is provided to minimize HPB entry inactivation resulting from data associated with hot reads being retrieved from multiple HPB sub-regions covering a logical-to-physical table. The method includes activating a storage device to support an HPB feature in a multiple HPB sub-region mode. The method also includes tracking, by a controller, a hit count associated with a logical block address in a read command received from a host device, determining that the hit count has reached a hit threshold, and updating a hit table to identify logical block address pages associated with hit counts that have reached the hit threshold across HPB sub-regions covering a logical-to-physical table. The method further includes transmitting, by the controller, the hit table to the host device to be stored in an HPB cache on the host device and to be used by the host device for read commands sent from the host device to the storage device.

In some implementations, a method is provided for updating a HPB cache after performing background operations. The method includes activating a storage device to support an HPB feature in a multiple HPB sub-region mode. The method also includes tracking, by a controller, a hit count associated with a logical block address in a read command received from a host device, determining that the hit count has reached a hit threshold, updating a hit table to identify logical block address pages associated with hit counts that have reached the hit threshold across HPB sub-regions covering a logical-to-physical table, and transmitting the hit table to the host device to be stored in an HPB cache on the host device and to be used by the host device for read commands sent from the host device to the storage device.

The controller also performs a background operation, sends an indication to the host device that an entry in the HPB cache is invalid, and provides an indication for the host device to invalidate the entries in the HPB cache or provides a predefined number of new mappings for invalidated entries in the hit table.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
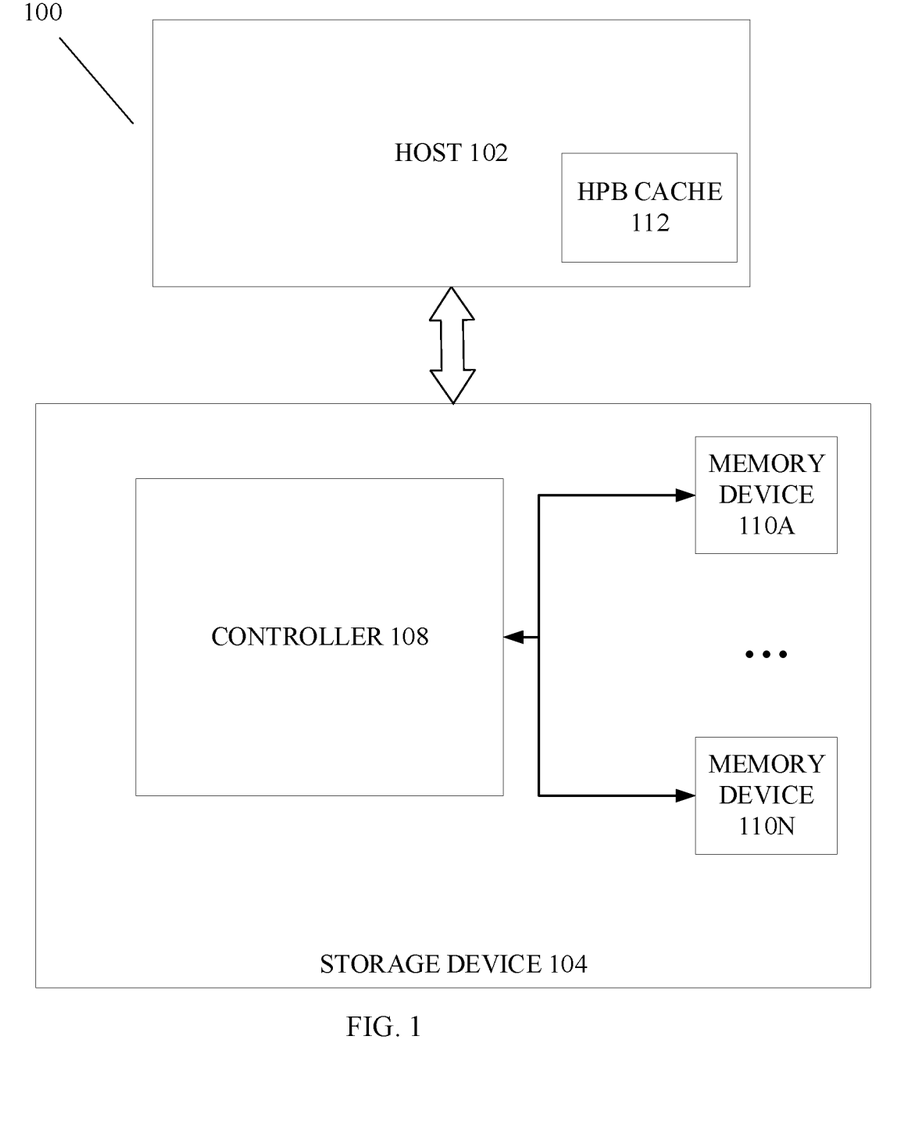
FIG. 1 is a schematic block diagram of an example system in accordance with some implementations.

FIG. 1 is a schematic block diagram of an example system in accordance with some implementations. System 100 includes a host 102 and a storage device 104. Host 102 may transmit commands to read or write data to storage device 104. Host 102 may include a host performance booster (HPB) cache 112 to store mapping information. Host 102 and storage device 104 may be in the same physical location as components on a single computing device or on different computing devices that are communicatively coupled. Storage device 104, in various implementations, may be disposed in one or more different locations relative to the host 102. Host 102 may include additional components (not shown in this figure for the sake of simplicity).

Storage device 104 may include a controller 108 and one or more memory devices 110a-110n (referred to herein as memory device(s) 110). Storage device 104 may be, for example, a Universal Flash Storage (UFS) device, and the like. Storage device 104 may support a HPB feature to enable host 102 to boost the read performance on storage device 104. Memory device 110 may be flash based, including, for example, NAND flash memory. Memory device 110 may be included in storage device 104 or may be otherwise communicatively coupled to storage device 104. Memory device 110 may be divided into blocks and data may be stored in the blocks in various formats.

Controller 108 may process foreground operations to read data from or write data to memory device 110 based on instructions received from host 102. When host 102 sends a read command to storage device 104, host 102 may send a logical block address associated with the data. Controller 108 may access the data stored on memory device 110 by accessing a logical-to-physical (L2P) table including a mapping of the logical address(es) associated with data with physical address(es) on memory device 110. An HPB LUN representing regions covering the L2P table may be divided into equally sized HPB regions, wherein the last HPB region may be smaller than the other HPB regions if the logical unit size is not an integer multiple of a specified HPB region size. The HPB regions may be further divided into equally sized HPB sub-regions, wherein the last HPB sub-region may be smaller than the other HPB sub-regions if the logical unit size is not an integer multiple of a specified HPB sub-region size. HPB sub-regions may include a continuous range of L2P entries in the L2P table. In some implementations, the size of the data stored in HPB cache 112 may be equivalent to the size of the data stored in four HPB sub-regions.

When storage device 104 is initialized, host 102 may determine if storage device 104 supports the HPB feature, and if it does, host 102 may activate a device-controlled mode or host-controlled mode on storage device 104 and allocate space in the host memory for HPB cache 112. Host 102 may also determine if storage device 104 supports a multiple HPB sub-region mode. If storage device 104 does not support the multiple HPB sub-region mode, when storage device 104 receives a HPB read buffer command from host 102, storage device 104 may transmit L2P entries associated with a two HPB sub-regions to host 102 in single HPB read buffer command, to be stored in HPB cache 112. Host 102 may issue two HPB read buffer commands to store the L2P entries associated with four HPB sub-regions in HPB cache 112.

If storage device 104 supports the multiple HPB sub-region mode, storage device may transmit L2P entries associated with multiple HPB sub-regions to host 102 to be stored in HPB cache 112. In the multiple HPB sub-region mode, when storage device 104 receives a read command from host 102, controller 108 may update a hit count for the logical block address page associated with the read command. Controller 108 may track how frequently each logical block address page is accessed. In the device-controlled mode, storage device 104 may set a hit threshold, and in the host-controlled mode, host 102 may set a hit threshold and transmit the hit threshold to storage device 104. If the hit count associated with a logical block address page reaches the hit threshold, controller 108 may determine that the logical block address is associated with hot reads, i.e., the logical block address is frequently accessed and may be stored in HPB cache 112 to improve the read performance on storage device 104, especially that of the HPB LUN.

Controller 108 may maintain a hit table including, for example, a four-byte logical block address associated with a hot read, a corresponding eight-byte physical address, and a four-byte run length covering the length of the hot read. As such, the hit table may identify hot logical block address pages across HPB sub-regions covering the L2P table, irrespective of whether or not the pages are in the same HPB sub-region. Entries in the hit table may be sorted in order of hotness. In some cases, the sorted entries in the hit table may be assigned weights. For example, if two or more hot pages are sequential, then the entries associated with those pages may be assigned higher weight and prioritized over the entries of other hot pages. Storage device 104 may also use other algorithms to identify hot reads.

Controller 108 may keep track of the hit count for every read request occurring in HPB sub-regions. When the size of the data stored in the hit table is equivalent to a predefined size, storage device 104 may notify host 102 to read the hit table. For example, when the hit table includes data equivalent in size to that stored in two HPB sub-regions, storage device 104 may notify host 102 to read the hit table. Storage device 104 may send a response UFS Protocol Information Unit (UPIU) indication to host 102. The response UPIU indication may also indicate that storage device is operating in the multiple HPB sub-region mode and that the L2P mappings in the hit table are from multiple HPB sub-regions.

Host 102 may issue an HPB read buffer command to storage device 104 to obtain the entries stored in the hit table. In response to the HPB read buffer command, storage device 104 may send a response UPIU to host 102, wherein storage device 104 may include the information from the hit table in the read data buffer along with response UPIU. Host 102 may process the response UPIU and store the hit table information in HPB cache 112. When host 102 wants to retrieve data associated with entries in HPB cache 112, host 102 may issue an HPB read command, including both the logical address and the physical address obtained from HPB cache 112, to enable storage device 104 to read the data from memory device 110. The L2P entries stored in HPB cache 112 may thus include logical block addresses obtained from different HPB sub-regions covering the entire L2P table as compared to logical block addresses from the same sub-regions which have a contiguous mapping.

Controller 108 may also execute background operations to manage resources on memory device 110. For example, controller 108 may monitor memory device 110 and may execute garbage collection and other relocation functions per internal relocation algorithms to refresh and/or relocate the data on memory device 110. When controller 108 performs background operations on memory device 110 and moves data from one physical address on memory device 110 to another, storage device 104 may invalidate the logical-to-physical mapping of an entry in the hit table. Storage device 104 may send an indication to host 102 to indicate that L2P mappings in HPB cache 112 may be invalid. In some cases, if the number of invalid mappings is less than or equal to a predefined number, for example, sixteen or less, storage device 104 may provide the new mappings in a response UPIU buffer which may be used to transfer 256 bytes of data along with a response. As noted, one mapping in the hit table may be sixteen bytes, i.e., four-bytes for the logical block address, eight bytes for the physical block address, and four-bytes for the run length. So, storage device 104 may transmit up to sixteen new mappings in the response UPIU buffer. If the new mappings are more than the predefined number, storage device 104 may send an indication to host 102 for host 102 invalidate HPB cache 112. For example, storage device 104 may clear the response UPIU buffer. When host 102 processes the response UPIU buffer and determines that the buffer has no data, host 102 may invalidate the mappings in HPB cache 112.

In some cases, storage device 104 may determine that new entries in the hit table are hotter than the entries previously transmitted to host 102. Storage device 104 may send the new hotter entries in a response UPIU. Host 102 may amend the entries in HPB cache 112 by, for example, deleting the least hot entries in HPB cache 112 to make room for the new hotter entries. In some cases, storage device 104 may continuously update the hit table and may not send updates to host 102. Host 102 may periodically query storage device to determine if the hit table has been updated and to request the updated hit table.

In host control mode, host 102 may also invalidate all entries in HPB cache 112 by sending an HPB write buffer command with a first predefined buffer identification. When storage device 104 receives the HPB write buffer command with the first predefined buffer identification, storage device 104 may invalidate the entries in the hit table. Host 102 may also issue a write command to write on a cached logical block address and thereby invalidate the L2P mapping for a specific entry in HPB cache 112. Host 102 may invalidate the specific entry in HPB cache 112 by sending the HPB write buffer command with a second predefined buffer identification.

In the multiple HPB sub-region mode, host 102 may cache L2P entries for logical block addresses across multiple HPB sub-regions covering the L2P table. Host 102 may send only one HPB read buffer command to cache these L2P mappings for logical block addresses in multiple HPB sub-regions covering the L2P table and minimize HPB invalidations due to logical block addresses access in wide range. Host 102 may thus enhance performance on reads across multiple HPB regions covering the L2P table. Since the logical block addresses across multiple HPB sub-regions are stored on HPB cache 112, host 102 may select a range of logical block addresses on which it is going to write but still have a bigger L2P table with it to get the enhanced read performance (unlike legacy methods in which a single write on cached region leads to whole table getting invalidated).

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2A:
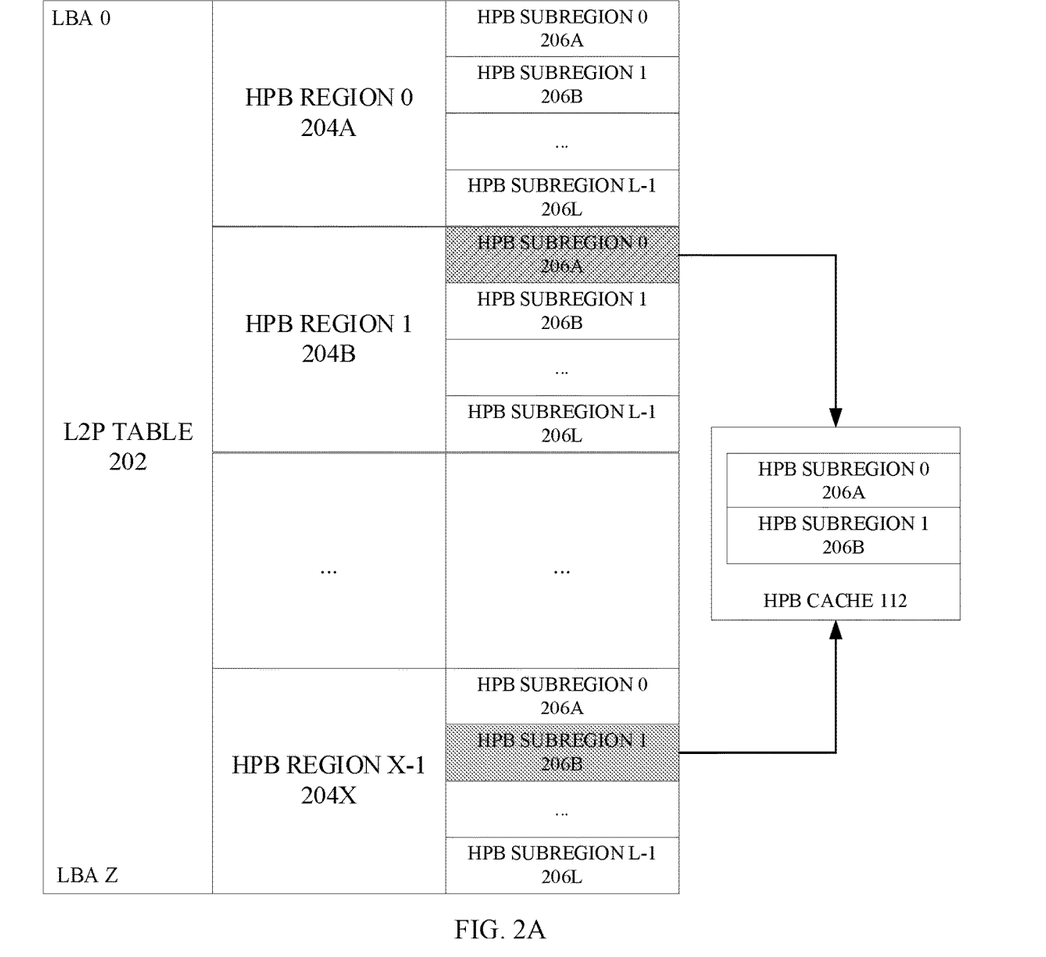
FIGS. 2A and 2B are block diagrams of HPB regions and sub-regions associated with an L2P table, wherein portions of the entries in the L2P table are stored in an HPB cache in accordance with some implementations.
Figure 2B:
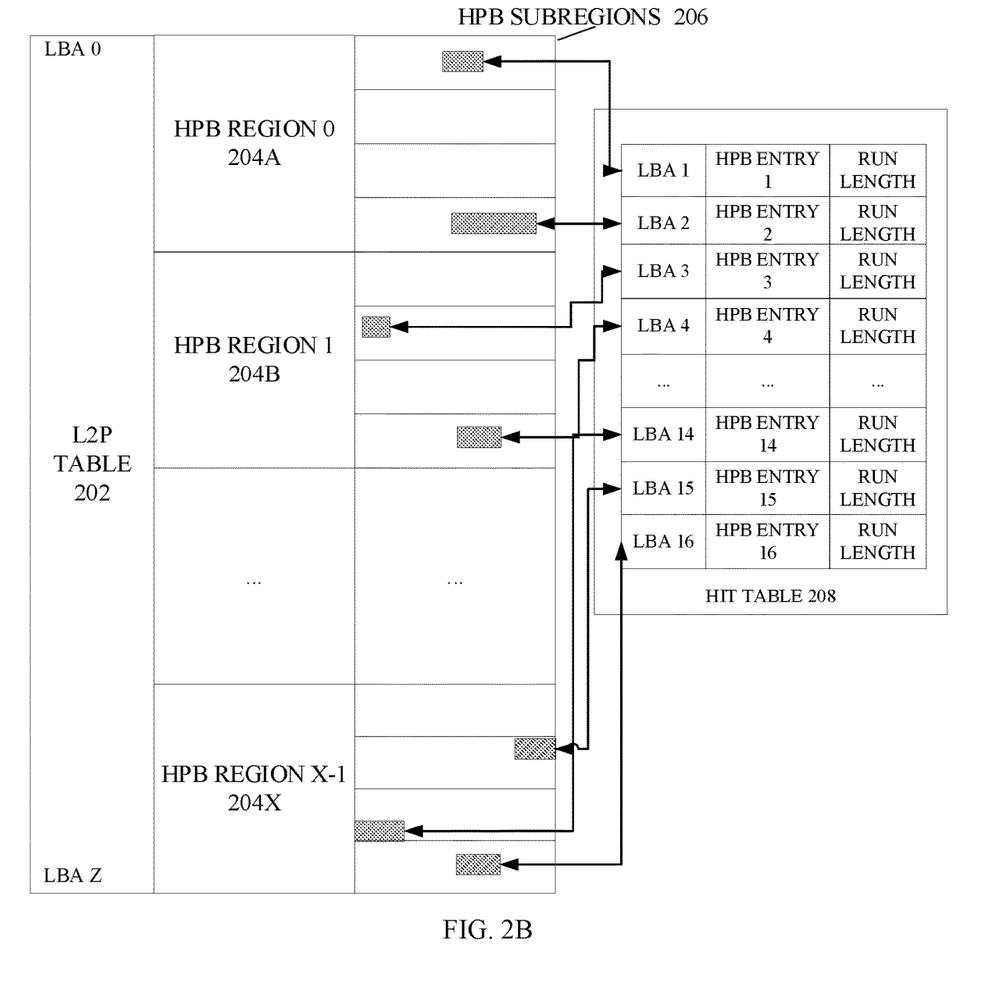

FIGS. 2A and 2B are block diagrams of HPB regions and sub-regions associated with an L2P table, wherein portions of the entries in the L2P table are stored in an HPB cache in accordance with some implementations. L2P table 202 may include L2P entries associated with logical block addresses (LBA), starting from LBA 0 to LBA Z. L2P table 202 may be divided into equally sized HPB regions 204a-204x (referred to herein as HPB region(s) 204). The last HPB region 204x may be smaller than the other HPB regions 204 if the logical unit size is not an integer multiple of a specified HPB region size. HPB regions 204 may be further divided into equally sized HPB sub-regions 206a-206l (referred to herein as HPB sub-region(s) 206). The last HPB sub-region 206l may be smaller than the other HPB sub-regions 206 if the logical unit size is not an integer multiple of a specified HPB sub-region size. HPB sub-regions 206 may include a continuous range of logical block addresses from L2P table 202.

If storage device 104 supports the HPB feature but does not support the multiple HPB sub-region mode, storage device 104 may transmit L2P entries in two HPB sub-regions per HPB Read Buffer request 206 to host 102 for host 102 to store in HPB cache 112. For example, FIG. 2A shows that storage device 104 may transmit L2P entries in sub-region 206a of regions 204b and sub-region 206b of region 204x to host 102 for host 102 to store in HPB cache 112.

If storage device 104 supports the HPB feature and is operating in the multiple HPB sub-region mode, storage device 104 may store a four-byte LBA, an eight-byte HPB entry, and a four-byte run length for each hot read in hit table 208. FIG. 2B shows the hot read from various HPB sub-regions as shaded sections in the HPB sub-regions 206. Storage device 104 may transmit hit table 208 to host 102 for host 102 to store hit table 208 in HPB cache 112. In some implementations, the size of the data stored in hit table 208 may be equivalent to the size of the data stored in two HPB sub-regions 206. FIGS. 2A and 2B are provided as examples. Other examples may differ from what is described in FIGS. 2A and 2B.

Figure 3:
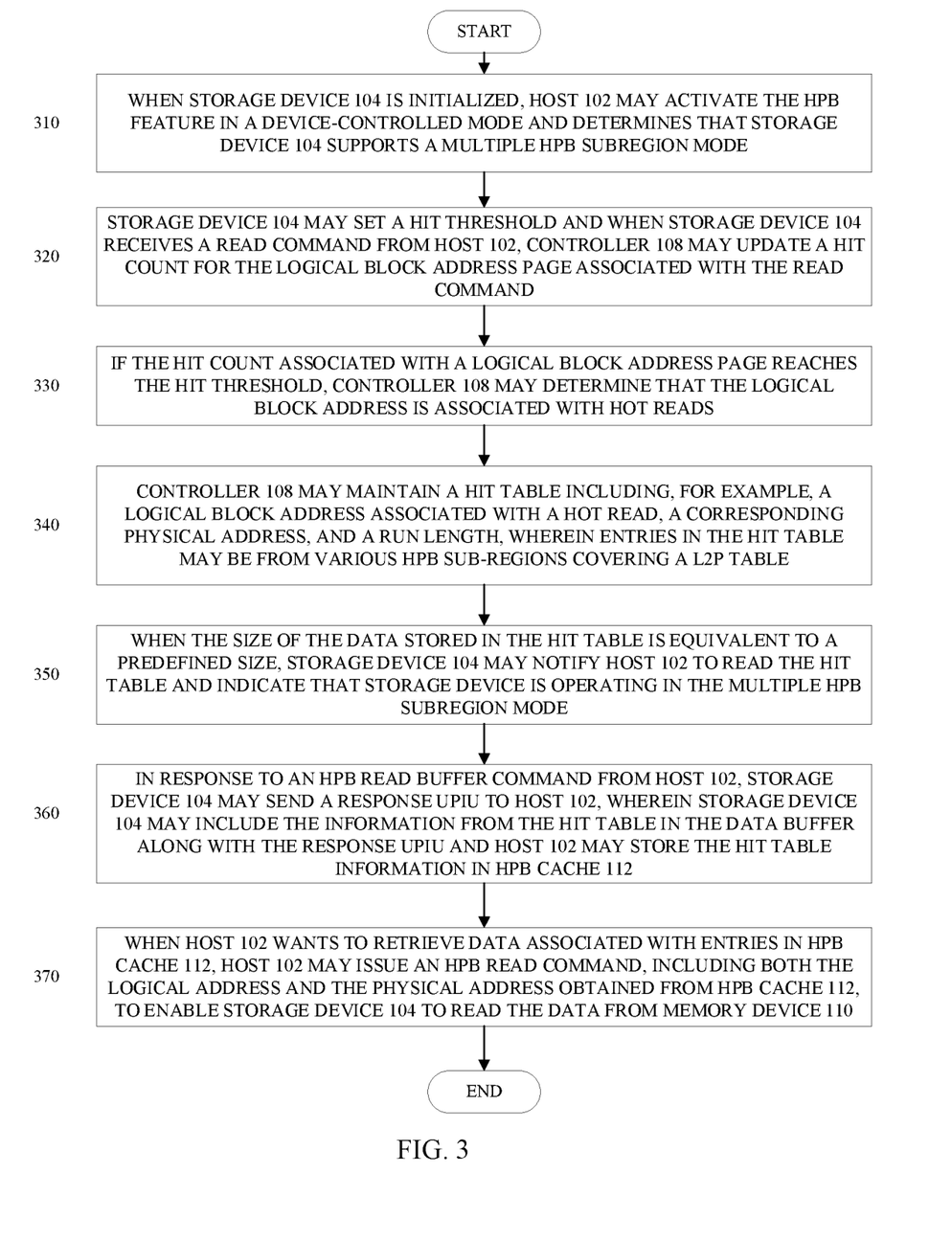
FIG. 3 is a flow diagram of an example process for supporting HPB features in a device-controlled mode and a multiple HPB sub-region mode in accordance with some implementations.

FIG. 3 is a flow diagram of an example process for supporting HPB features in a device-controlled mode and a multiple HPB sub-region mode in accordance with some implementations. At 310, when storage device 104 is initialized, host 102 activates the HPB feature in a device-controlled mode and determines that storage device 104 supports a multiple HPB sub-region mode. At 320, storage device 104 may set a hit threshold and when storage device 104 receives a read command from host 102, controller 108 may update a hit count for the logical block address page associated with the read command. At 330, if the hit count associated with a logical block address page reaches the hit threshold, controller 108 may determine that the logical block address is associated with hot reads. At 340, controller 108 may maintain a hit table including, for example, a logical block address associated with a hot read, a corresponding physical address, and a run length, wherein entries in the hit table may be from various HPB sub-regions covering a L2P table.

At 350, when the size of the data stored in the hit table is equivalent to a predefined size, storage device 104 may notify host 102 to read the hit table and indicate that storage device is operating in the multiple HPB sub-region mode. At 360, in response to an HPB read buffer command from host 102, storage device 104 may send a response UPIU to host 102, wherein storage device 104 may include the information from the hit table in the data buffer along with the response UPIU and host 102 may store the hit table information in HPB cache 112. At 370, when host 102 wants to retrieve data associated with entries in HPB cache 112, host 102 may issue an HPB read command, including both the logical address and the physical address obtained from HPB cache 112, to enable storage device 104 to read the data from memory device 110. As indicated above FIG. 3 is provided as an example. Other examples may differ from what is described in FIG. 3.

Figure 4:
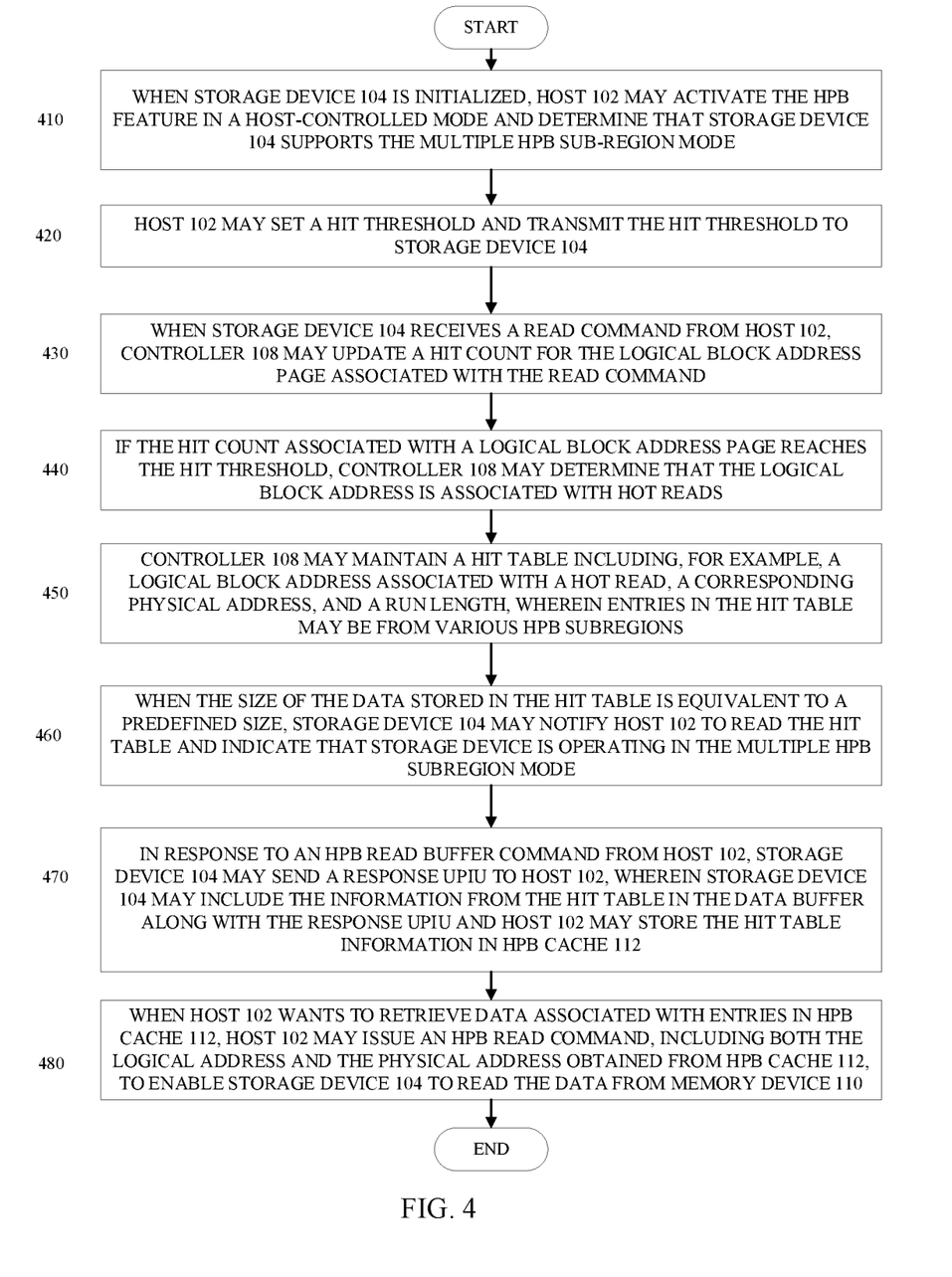
FIG. 4 is a flow diagram of an example process for supporting HPB features in a host-controlled mode and a multiple HPB sub-region mode in accordance with some implementations.

FIG. 4 is a flow diagram of an example process for supporting HPB features in a host-controlled mode and a multiple HPB sub-region mode in accordance with some implementations. At 410, when storage device 104 is initialized, host 102 may activate the HPB feature in a host-controlled mode and determine that storage device 104 supports the multiple HPB sub-region mode. At 420, host 102 may set a hit threshold and transmit the hit threshold to storage device 104. At 430, when storage device 104 receives a read command from host 102, controller 108 may update a hit count for the logical block address page associated with the read command. At 440, if the hit count associated with a logical block address page reaches the hit threshold, controller 108 may determine that the logical block address is associated with hot reads. At 450, controller 108 may maintain a hit table including, for example, a logical block address associated with a hot read, a corresponding physical address, and a run length, wherein entries in the hit table may be from various HPB sub-regions.

At 460, when the size of the data stored in the hit table is equivalent to a predefined size, storage device 104 may notify host 102 to read the hit table and indicate that storage device is operating in the multiple HPB sub-region mode. At 470, in response to an HPB read buffer command from host 102, storage device 104 may send a response UPIU to host 102, wherein storage device 104 may include the information from the hit table in the data buffer along with the response UPIU and host 102 may store the hit table information in HPB cache 112. At 480, when host 102 wants to retrieve data associated with entries in HPB cache 112, host 102 may issue an HPB read command, including both the logical address and the physical address obtained from HPB cache 112, to enable storage device 104 to read the data from memory device 110. As indicated above FIG. 4 is provided as an example. Other examples may differ from what is described in FIG. 4.

Figure 5:
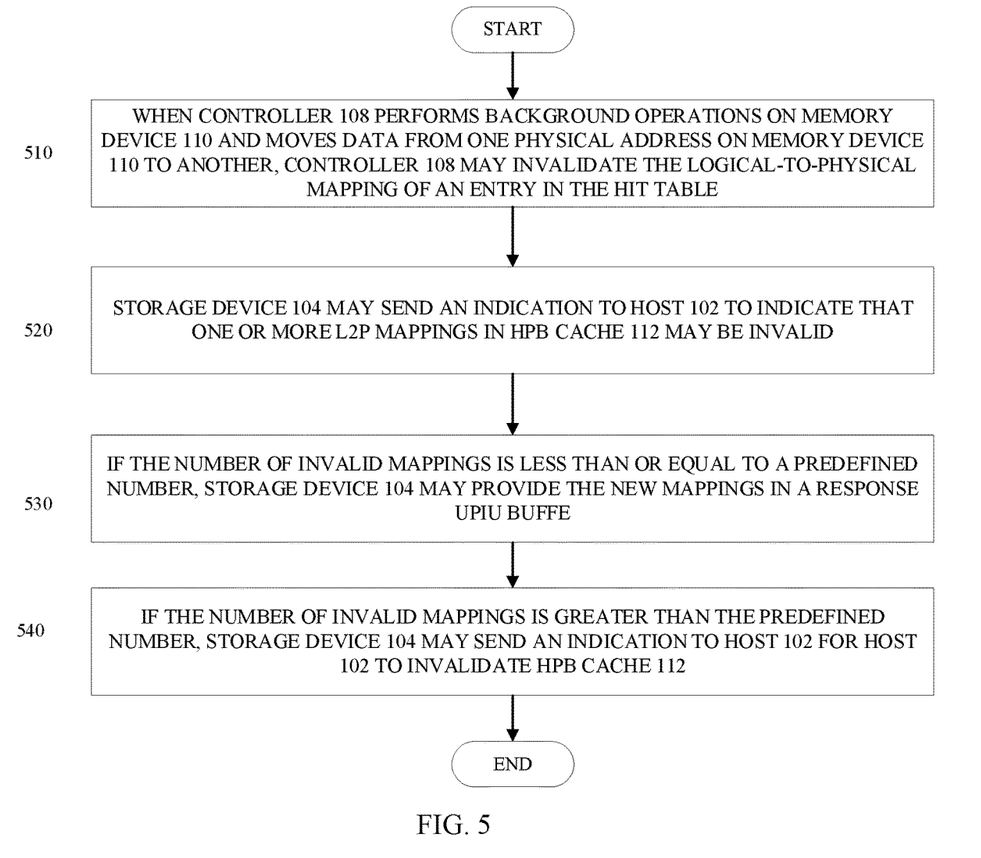
FIG. 5 is a flow diagram of an example process for updating the HPB cache after performing background operations which may invalidate entries in the hit table in accordance with some implementations.

FIG. 5 is a flow diagram of an example process for updating the HPB cache after performing background operations which may invalidate entries in the hit table in accordance with some implementations. At 510, when controller 108 performs background operations on memory device 110 and moves data from one physical address on memory device 110 to another, controller 108 may invalidate the logical-to-physical mapping of an entry in the hit table. At 520, storage device 104 may send an indication to host 102 to indicate that one or more L2P mappings in HPB cache 112 may be invalid. At 530, if the number of invalid mappings is less than or equal to a predefined number, storage device 104 may provide the new mappings in a response UPIU buffer. At 540, if the number of invalid mappings is greater than the predefined number, storage device 104 may send an indication to host 102 for host 102 to invalidate HPB cache 112. As indicated above FIG. 5 is provided as an example. Other examples may differ from what is described in FIG. 5.

Figure 6:
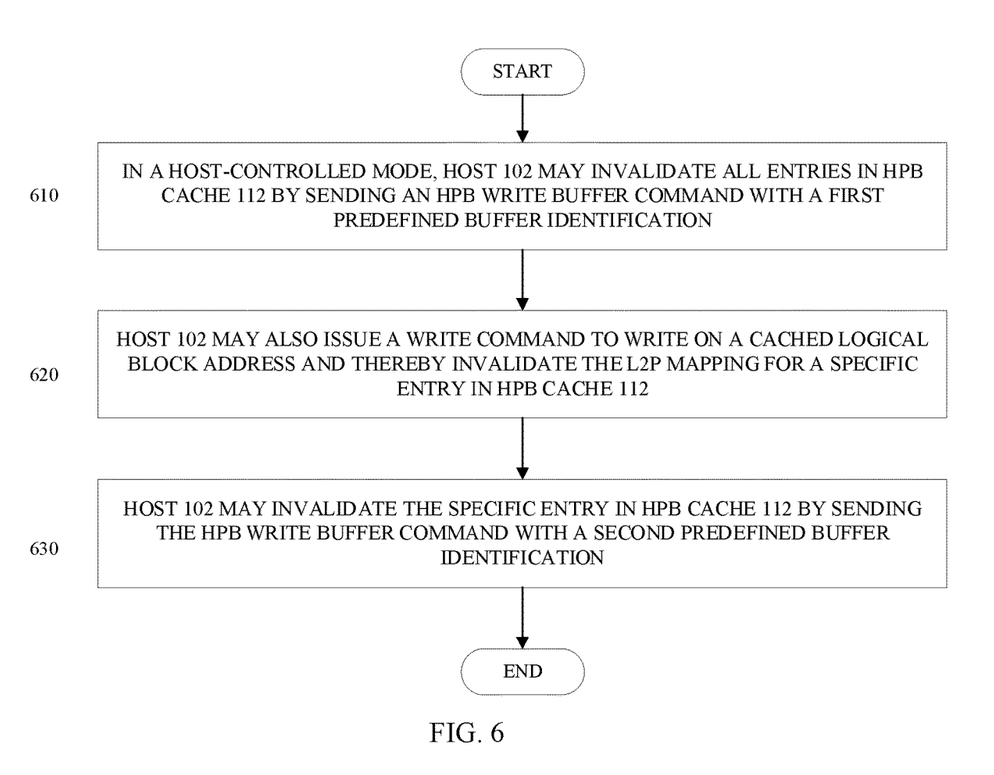
FIG. 6 is a flow diagram of an example process for invalidating the HPB cache in host-controlled mode in accordance with some implementations.

FIG. 6 is a flow diagram of an example process for invalidating the HPB cache in a host-controlled mode in accordance with some implementations. At 610, in the host-controlled mode, host 102 may invalidate all entries in HPB cache 112 by sending an HPB write buffer command with a first predefined buffer identification. At 620, host 102 may also issue a write command to write on a cached logical block address and thereby invalidate the L2P mapping for a specific entry in HPB cache 112. At 630, host 102 may invalidate the specific entry in HPB cache 112 by sending the HPB write buffer command with a second predefined buffer identification. As indicated above FIG. 6 is provided as an example. Other examples may differ from what is described in FIG. 6.

Figure 7:
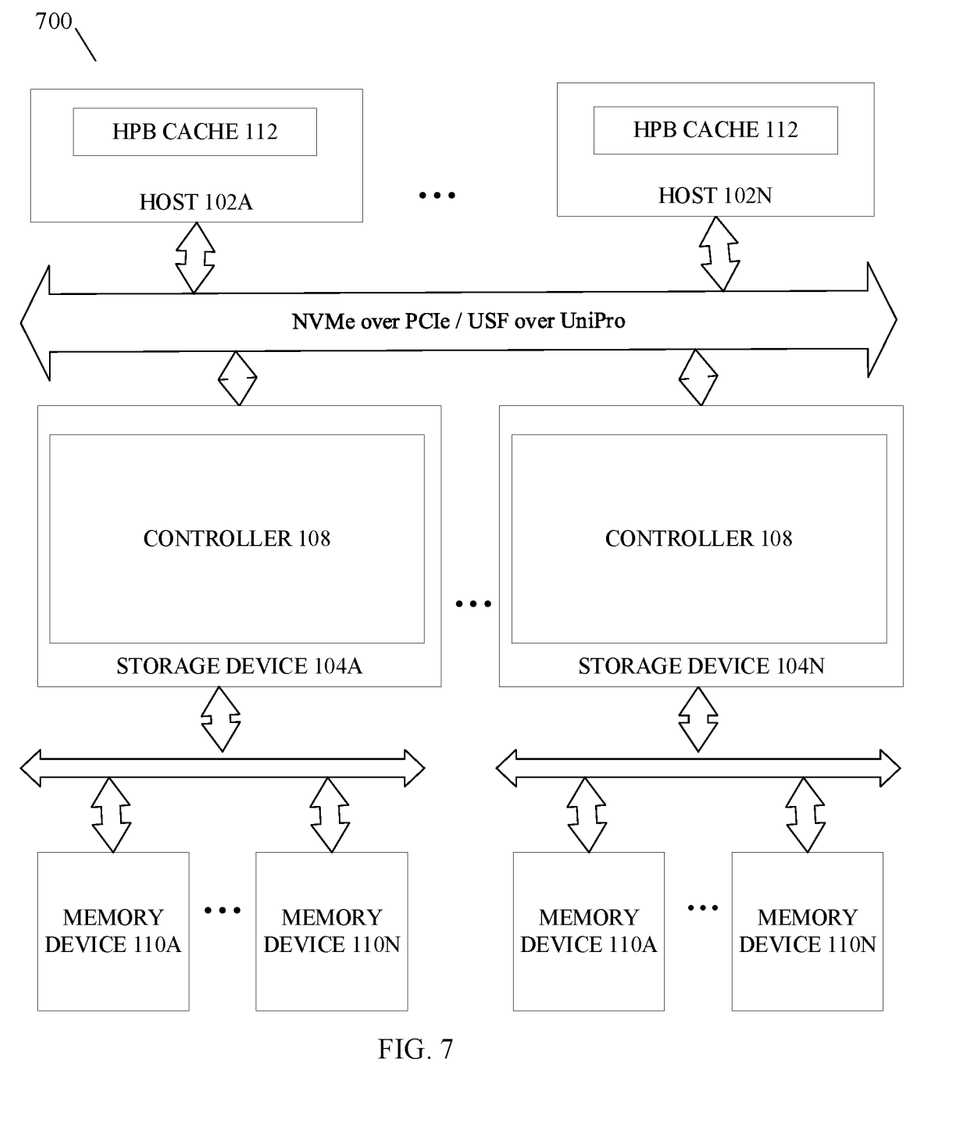
FIG. 7 is a diagram of an example environment in which systems and/or methods described herein are implemented.

FIG. 7 is a diagram of an example environment in which systems and/or methods described herein are implemented. As shown in FIG. 7, Environment 700 may include hosts 102-102n (referred to herein as host(s) 102), and storage devices 104a-104n (referred to herein as storage device(s) 104).

Storage device 104 may include a controller 108 to manage the resources on storage device 104. Controller 108 may update and maintain the hit table to identify hot reads in HPB sub-regions covering a L2P table. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 700 may interconnect via wired connections, wireless connections, or a combination of wired and wireless connections. For example, the network of FIG. 7 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of Environment 700 may perform one or more functions described as being performed by another set of devices of Environment 700.

Figure 8:
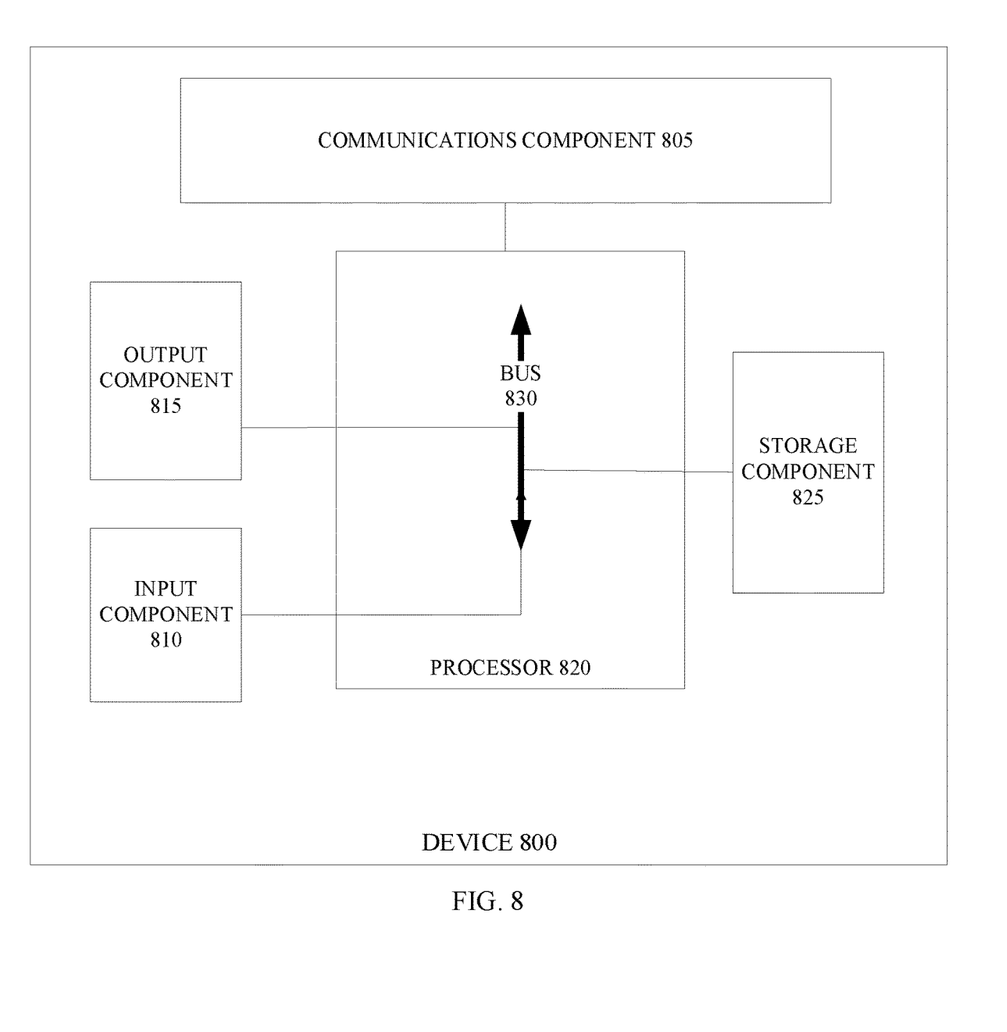
FIG. 8 is a diagram of example components of the host of FIG. 1.

FIG. 8 is a diagram of example components of one or more devices of FIG. 1. In some implementations, host 102 may include one or more devices 800 and/or one or more components of device 800. Device 800 may include, for example, a communications component 805, an input component 810, an output component 815, a processor 820, a storage component 825, and a bus 830. Bus 830 may include components that enable communication among multiple components of device 800, wherein components of device 800 may be coupled to be in communication with other components of device 800 via bus 830.

Input component 810 may include components that permit device 800 to receive information via user input (e.g., keypad, a keyboard, a mouse, a pointing device, a microphone, and/or a display screen), and/or components that permit device 800 to determine the location or other sensor information (e.g., an accelerometer, a gyroscope, an actuator, another type of positional or environmental sensor). Output component 815 may include components that provide output information from device 800 (e.g., a speaker, display screen, and/or the like). Input component 810 and output component 815 may also be coupled to be in communication with processor 820.

Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 may include one or more processors capable of being programmed to perform a function. Processor 820 may be implemented in hardware, firmware, and/or a combination of hardware and software.

Storage component 825 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 820. A memory device may include memory space within a single physical storage device or memory space spread across multiple physical storage devices. Storage component 825 may also store information and/or software related to the operation and use of device 800. For example, storage component 825 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 805 may include a transceiver-like component that enables device 800 to communicate with other devices, such as via a wired connection, a wireless connection, or a combination of wired and wireless connections. The communications component 805 may permit device 800 to receive information from another device and/or provide information to another device. For example, communications component 805 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 805 may also include one or more broadband and/or narrowband transceivers and/or other similar types of wireless transceiver configurable to communicate via a wireless network for infrastructure communications. Communications component 805 may also include one or more local area network or personal area network transceivers, such as a Wi-Fi transceiver or a Bluetooth transceiver.

Device 800 may perform one or more processes described herein. For example, device 800 may perform these processes based on processor 820 executing software instructions stored by a non-transitory computer-readable medium, such as storage component 825. As used herein, the term "computer-readable medium" refers to a non-transitory memory device. Software instructions may be read into storage component 825 from another computer-readable medium or from another device via communications component 805. When executed, software instructions stored in storage component 825 may cause processor 820 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to support a host performance booster (HPB) feature and a multiple HPB sub-region mode, the storage device is communicatively coupled to a host device including an HPB cache, the storage device comprises:
a controller to track a hit count associated with a logical block address, determine that the hit count has reached a hit threshold, update a hit table to identify logical block address pages, associated with hit counts that have reached the hit threshold, across HPB sub-regions covering a logical-to-physical table, and transmit the hit table to a host device to be stored in an HPB cache on the host device and the hit table to be used by the host device for read commands sent from the host device to the storage device.

2. The storage device of claim 1, wherein the hit table includes the logical block address, an associated physical block address, and a run length for logical block addresses associated with hot reads and wherein entries in the hit table include logical block addresses from HPB sub-regions covering the logical-to-physical table.

3. The storage device of claim 1, wherein the controller updates the hit count associated with the logical block address when a read command from the host device includes the logical block address.

4. The storage device of claim 1, wherein the storage device sets the hit threshold in device-controlled mode.

5. The storage device of claim 1, wherein the host device sets the hit threshold in a host-controlled mode and transmits the hit threshold to the storage device.

6. The storage device of claim 1, wherein the storage device sorts and assigns weights to entries in the hit table.

7. The storage device of claim 1, wherein when a size of the hit table is equivalent to a predefined size, the storage device notifies the host device to read the hit table and the storage device notifies the host device i) that the storage device is operating in the multiple HPB sub-region mode and ii) that entries in the hit table are from HPB sub-regions covering the logical-to-physical table.

8. The storage device of claim 1, wherein the storage device i) sends an indication to the host device when an entry in the hit table is invalidated and ii) provides a predefined number of new mappings, for invalidated entries in the hit table, in a response buffer.

9. The storage device of claim 1, wherein the storage device sends an indication to the host device when a predefined number of entries in the hit table are invalidated, the indication being for the host device to invalidate the entries in the HPB cache.

10. The storage device of claim 1, wherein when the storage device receives an HPB write buffer command with a first predefined buffer identification from the host device, the storage device invalidates entries in the hit table.

11. The storage device of claim 1, wherein when the storage device receives an HPB write buffer command with a second predefined buffer identification from the host device, the storage device invalidates a specific entry in the hit table.

12. A method for minimizing host performance booster (HPB) entry inactivation resulting from data associated with hot reads being retrieved from multiple HPB sub-regions covering a logical-to-physical table, the method comprising:
   activating a storage device to support an HPB feature in a multiple HPB sub-region mode;
   tracking, by a controller, a hit count associated with a logical block address in a read command received from a host device;
   determining, by the controller, that the hit count has reached a hit threshold;
   updating, by the controller, a hit table to identify logical block address pages, associated with hit counts that have reached the hit threshold, across HPB sub-regions covering a logical-to-physical table; and
   transmitting, by the controller, the hit table to the host device to be stored in an HPB cache on the host device and the hit table to be used by the host device for read commands sent from the host device to the storage device.

13. The method of claim 12, further comprising updating, by the controller, the hit count associated with the logical block address when a read command from the host includes the logical block address.

14. The method of claim 12, further comprising sorting and assigning weights, by the controller, to entries in the hit table.

15. The method of claim 12, further comprising notifying, by the controller, the host device to read the hit table in response to a size of the hit table being equivalent to a predefined size, wherein the notifying includes an indication i) that the storage device is operating in the multiple HPB sub-region mode and ii) that entries in the hit table are from HPB sub-regions covering the logical-to-physical table.

16. The method of claim 12, further comprising sending, by the controller, an indication to the host device in response to an entry in the hit table being invalidated and the controller providing a predefined number of new mappings, for invalidated entries, in the hit table in a response buffer.

17. The method of claim 12, further comprising sending, by the controller, an indication to the host device in response a predefined number of entries in the hit table being invalidated, wherein the indication is for the host device to invalidate the entries in the HPB cache.

18. The method of claim 12, further comprising invalidating, by the controller, entries in the hit table in response to the storage device receiving an HPB write buffer command, with a first predefined buffer identification, from the host device.

19. The method of claim 12, further comprising invalidating, by the controller, a specific entry in the hit table in response to the storage device receiving an HPB write buffer command, with a second predefined buffer identification, from the host device.

20. A method for minimizing host performance booster (HPB) entry inactivation resulting from data associated with hot reads being retrieved from multiple HPB sub-regions covering a logical-to-physical table and for updating a HPB cache after performing background operations, the method comprising:
   activating a storage device to support an HPB feature in a multiple HPB sub-region mode;
   tracking, by a controller, a hit count associated with a logical block address in a read command received from a host device;
   determining, by the controller, that the hit count has reached a hit threshold;
   updating, by the controller, a hit table to identify logical block address pages, associated with hit counts that have reached the hit threshold, across HPB sub-regions covering a logical-to-physical table;
   transmitting, by the controller, the hit table to the host device to be stored in an HPB cache on the host device and to be used by the host device for read commands sent from the host device to the storage device; and
   performing, by the controller, a background operation, sending an indication to the host device that an entry in the HPB cache is invalid, and providing one of i) an indication for the host device to invalidate the entries in the HPB cache and ii) a predefined number of new mappings, for invalidated entries, in the hit table in a response buffer.

\* \* \* \* \*